3,348,940
HERBICIDAL AND INSECTICIDAL
COMPOSITION
Roger Williams Addor, Pennington N.J., assignor to
American Cyanamid Company, Stamford, Conn., a
corporation of Maine
No Drawing. Original application Dec. 5, 1963, Ser. No.
328,204, now Patent No. 3,318,910, dated May 9, 1967.
Divided and this application Jan. 31, 1967, Ser. No.
612,818
6 Claims. (Cl. 71—90)

ABSTRACT OF THE DISCLOSURE

The invention is directed to an insecticidal and herbicidal composition consisting essentially of an inert carrier and an effective amount of a compound of the formula:

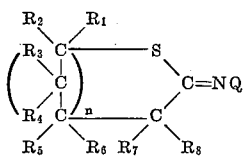

wherein $R_1$, $R_2$, $R_3$, $R_4$, $R_5$, $R_6$, $R_7$ and $R_8$ are each a substituent selected from the class consisting of hydrogen and lower alkyl; $n$ is an integer from 0 to 1; and Q is a substituent selected from the group consisting of $H_2X$ and $-PZ(OR_{10})_2$, in which X is a halogen atom, Z is a substituent selected from the group consisting of oxygen and sulfur, and $R_{10}$ stands for lower alkyl.

This application is a divisional of my copending application for Letters Patent, Ser. No. 328,204, filed on Dec. 5, 1963, now U.S. Patent No. 3,318,910.

The present invention relates to novel pesticidal compounds. More particularly, the invention relates to 5-membered and 6-membered heterocyclic sulfur compounds containing in the two-position thereof an imino substituent, to methods for the preparation of such compounds, and to the utilization of the heterocyclic sulfur compounds as the active component in a pesticidal composition.

The novel hetero-sulfur compounds prepared in accordance with the present invention may be represented by the formula:

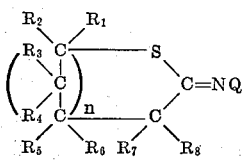

wherein each of the Rs is either hydrogen or lower alkyl; $n$ is an integer from 0 to 1; Q is either a $H_2X$ or $-PZ(OR_{10})_2$ group, in which X is a halogen atom, such as fluoro, chloro, bromo or iodo; $R_{10}$ stands for lower alkyl and Z represents oxygen or sulfur.

In general, the compounds of the invention may be synthesized in a straightforward and simple manner. Either a 4-acylthiobutyronitrile or a 5-acylthiovaleronitrile as prepared by reacting a thiolalkanoic acid with either a 4-halobutyronitrile or a 5-halovaleronitrile in an alkaline medium, is reacted with a hydrohalide, such as hydrochloric acid, either in an aqueous or alcoholic menstruum. In this manner, either the acylthiobutyronitrile or the acylthiovaleronitrile is converted to form either a 2-iminothiolane hydrochloride or a 2-iminothiane hydrochloride, respectively. The latter is then reacted with an O,O-di(lower)-alkylphosphorohalothioate or an O,O-di(lower)alkylphosphorohaloate in the presence of an acid acceptor such as triethylamine or sodium acetate, to obtain the desired product in good yield and purity.

The over-all reaction may be written as follows:

[I]

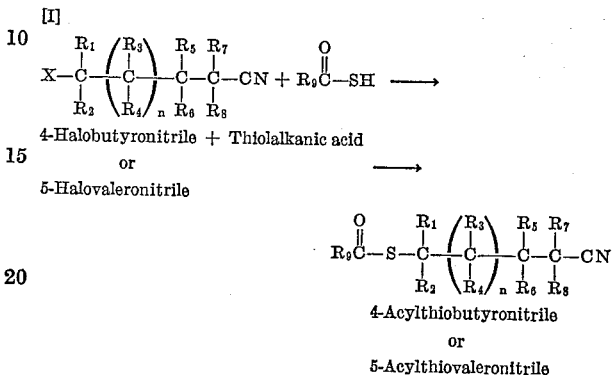

4-Halobutyronitrile + Thiolalkanic acid
or
5-Halovaleronitrile

4-Acylthiobutyronitrile
or
5-Acylthiovaleronitrile where X is a halogen atom, $n$ is an integer from 0 to 1, and each of the Rs represents hydrogen or a lower alkyl group.

[II]

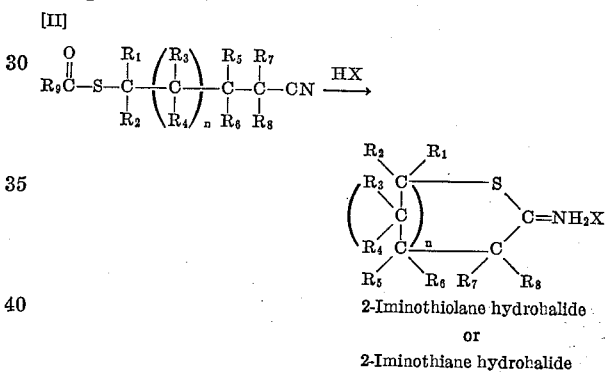

2-Iminothiolane hydrohalide
or
2-Iminothiane hydrohalide where $n$ and all the Rs are as defined in [I] above.

[III]

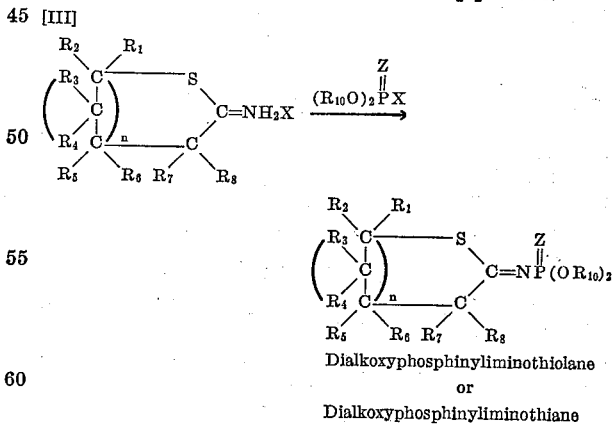

Dialkoxyphosphinyliminothiolane
or
Dialkoxyphosphinyliminothiane where Z is an oxygen or sulfur atom, $R_{10}$ is lower alkyl, and all the remaining Rs, X and $n$ are the same as defined in [I] above.

Illustrative of the 4-halobutyronitrile and the 5-halovaleronitrile reactants which can be employed herein are:

4-bromobutyronitrile,
5-bromovaleronitrile,
4-chloro-3-methylbutyronitrile,
4-chlorobutyronitrile, 4-iodobutyronitrile,
4-bromo-4-methylbutyronitrile,
5-bromo-5-methylvaleronitrile,
4-fluorobutyronitrile,
5-bromo-5-ethylvaleronitrile, and
4-bromo-2,3-dimethylbutyronitrile.

The aforementioned nitriles can preferably be dissolved in an alcoholic medium so as to cause more rapid completion of the reaction.

For purposes of reaction in step [I], any thiol(lower) alkanoic acid can be employed. For instance, thiolacetic acid, thiolpropionic acid or thiolbutanoic acid may advantageously be utilized.

In general, the typical phosphorohalothioates or the phosphorohaloate reactants employed herein are:

O,O-dimethyl phosphorochloridothioate,
O,O-diethyl phosphorochloridothioate,
O-methyl, O-ethyl phosphorochloridothioate,
O,O-di-isopropyl phosphorobromidothioate,
O,O-di-n-butyl phosphorochloridothioate,
O,O-di-sec.-pentyl phosphoroiodothioate,
O,O-dimethyl phosphorochloridate, and
O,O-diethyl phosphorochloridate.

To facilitate a further understanding of the invention, the following examples are presented primarily for purposes of illustrating certain more specific details thereof. The examples are not to be taken as limitative of the invention. Unless otherwise noted, all parts are by weight and the analyses are in percent.

EXAMPLE 1

*Preparation of 2-iminothiolane hydrochloride*

To a suitable reaction vessel containing 74.8 parts of 4-acetylthiobutyronitrile (prepared by reacting approximately one mol of 4-bromobutyronitrile with one mol of thiolacetic acid in the presence of potassium carbonate) in 200 parts by volume of methanol are added 275 parts of 2 N hydrogen chloride in methanol. The reaction contents are vigorously stirred for about eighteen hours. Methanol is next distilled and the reaction vessel is ice-cooled. 250 parts by volume of ether are then added. Precipitated solids are collected, washed with additional ether whereby 40.4 parts of a colorless product are obtained. The filtrate is then concentrated and the addition of ether affords a second crop of crystals amounting to 7.3 parts. The fractions are further purified by vacuum sublimation at 70° C. to 100° C. at 0.2 mm. Hg. A total yield of 47.7 parts, equal to 66.3 percent, is obtained. The melting point for 2-iminothiolane hydrochloride is 190° C. to 195° C. having the following analysis:

Calculated for $C_4H_8ClNS$: C, 34.9; H, 5.9; Cl, 25.8; S, 23.3. Found: C, 34.7; H, 5.7; Cl, 25.7; S, 23.2.

Substituting 4-acetylthio-4-methylbutyronitrile for the acetylthiobutyronitrile reactant above, a good yield of 2-imino-5-methylthiolane hydrochloride is obtained in good purity.

EXAMPLE 2

The procedure of Example 1 is followed in every detail, except that 5-acetylthiovaleronitrile is employed in lieu of 4-acetylthiobutyronitrile. A good yield of 2-iminothiane hydrochloride is obtained.

EXAMPLE 3

Repeating Example 1 in every detail, except that 5-acetylthio-5-methylvaleronitrile is substituted for the 4-acetylthiobutyronitrile reactant, there is obtained in good yield and purity, 2-imino-6-methylthiane hydrochloride.

EXAMPLE 4

*Preparation of 2-diethoxyphosphinothioyliminothiolane*

To 100 parts by volume of acetone stirred at between about 20° C. and 25° C. in a suitable reaction vessel are added 10 parts of 2-iminothiolane hydrochloride, 13.7 parts of O,O-diethyl phosphorochloridothioate, and 12 parts of sodium acetate. The mixture is then refluxed for about twelve hours while withdrawing samples intermittently. Upon infrared examination of the samples obtained, the reaction is found to be substantially complete within one hour.

Resultant solids are collected, ether-washed and the filtrate is concentrated in vacuo. Remaining oily substance is next taken up in an ether-benzene mixture and the mixture is washed employing water and potassium carbonate solution. After drying and concentrating the washed mixture, molecular distillation of the residual oil affords 13.9 parts or 75.5 percent of a colorless product possessing a refractive index ($n_D^{25}$) equal to 1.5467, and having the following analysis:

Calculated for $C_8H_{16}NO_2PS_2$: C, 37.9; H, 6.4; P, 12.2; S, 25.3. Found: C, 37.8; H, 6.0; P, 12.2; S, 25.3.

Substituting for the diethyl phosphorochloridothioate reactant in the above example O,O-diethyl phosphorochloridate, and, for the sodium acetate, triethylamine, 2-diethoxyphosphinyliminothiolane is obtained in good yield and purity.

EXAMPLE 5

*Preparation of 2-dimethoxyphosphinothioyliminothiolane*

Employing the procedure of Example 2 above, a mixture of 10 parts of 2-iminothiolane hydrochloride, 11.7 parts of O,O-dimethyl phosphorochloridothioate and 12.5 parts of sodium acetate is reacted. 11 parts equal to 67.2 percent of a pale yellow product having a refractive index ($n_D^{25}$) equal to 1.5742 is obtained which is identified as 2-dimethoxyphosphinothioyliminothiolane, analyzing in percent as follows:

Calculated for $C_6H_{12}NO_2PS_2$: C, 32.0; H, 5.4; P, 13.8; S, 28.5. Found: C, 32.4; H, 5.7; P, 14.4; S, 28.9.

It is an advantage of the present invention that the compounds hereinabove defined can be utilized by incorporating them into a variety of inert carriers or diluents. For instance, each of the compounds can be dissolved in an inert organic solvent, such as acetone, ethyl acetate, ethyl alcohol, benzene, xylene, kerosene or equivalents thereof; or the compounds may be admixed with an inert solid carrier, as for example, fuller's earth, precipitated hydrated silicon dioxide, activated carbon, bentonite, attaclay, celite, kaolin clay, a mixture of bentonite and attapulgite, and the like. If desired, a suspension of the compounds may be prepared by employing a non-solvent therefor. In that event, it is advantageous to add thereto any commercially available dispersing or surface-active agent of the anionic, cationic or nonionic types, or mixtures of the same. Illustrative surface-active agents are: the alkylaryl sulfonates, the calcium salt of an oil-soluble sulfonate and polyoxyethylene ethers, such as "Emcol H 140," the sodium salt of a polymerized propyl naphthalene sulfonic acid, formed by condensing formaldehyde with a propyl naphthalene sodium sulfonate, the alkylaryl polyether alcohols, the ethylene oxide addition products of such esters as for instance "Tween–20," and the like. Usually, from one to five parts of dispersing agent per one-hundred parts of compound is a good operating range.

The quantity of inert solid or liquid carrier or diluent employed with respect to the insecticidal compounds can be widely varied. It has, however, been found that, depending upon the carrier employed, from about 1% to 80% and preferably from about 20% to 70% by weight of the compounds, based on the weight of the inert carriers, is wholly satisfactory.

The rate of application of the over-all composition as applied to foliage, soil or seed can be widely varied. For instance, when applied to foliage, a convenient rate is found to be between 0.25 and 2 pounds of active compound per acre. As to soil application, a good operating rate is found to be between 1 and 5 pounds of active compound per acre. Finally, seeds can effectively be treated at a rate between about 1 to about 8 pounds by weight of the compound per 100 pounds of seed.

EXAMPLE 6

To demonstrate the effectiveness of the iminothiolane and the iminothiane compounds as pre-emergence herbicides, the following test is conducted:

Seeds of corn, radish and wheat are exposed to the test compound in aqueous media. They are held in intimate contact for three weeks after which time observations are made on germination, deformation of seedlings and kill. Employing the compounds of Example 1, 2-iminothiolane hydrochloride and 2-iminothiane hydrochloride, all roots of the seedlings are killed at a concentration of 500 parts per million.

EXAMPLE 7

To demonstrate the effectiveness of the compounds of the present invention with respect to insecticidal activity, the following example is presented:

A 65/35 acetone/water mixture at concentrations equal to 0.1% and 0.01% active ingredient comprising either 2-dimethoxyphosphinothioyliminothiolane or 2-diethoxyphosphinothioyliminothiolane, is prepared. Sieva lima bean plants with their first pair of leaves three to four inches in size are infested with approximately 100 to 200 adult mites per leaf about five hours prior to testing. The infested leaves are dipped into the test solutions for approximately three seconds, removed from said solution and permitted to dry. The dried leaves are then placed on separate dishes in a constant temperature room at 80° F. and 60% relative humidity for two days. After two days, each plant is examined and mortality counts are made. It is found that the above compounds, when applied at a concentration of 0.01%, produce one-hundred percent kill of adult mites.

I claim:

1. An insecticidal and herbicidal composition consisting essentially of an inert carrier and an effective amount of a compound of the formula:

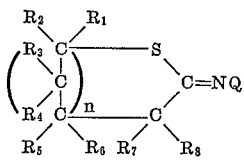

wherein $R_1$, $R_2$, $R_3$, $R_4$, $R_5$, $R_6$, $R_7$ and $R_8$ are each a substituent selected from the class consisting of hydrogen and lower alkyl; $n$ is an integer from 0 to 1; and Q is a substituent selected from the group consisting of $H_2X$ and $-PZ(OR_{10})_2$, in which X is a halogen atom, Z is a substituent selected from the group consisting of oxygen and sulfur, and $R_{10}$ stands for lower alkyl.

2. The composition according to claim 1: 2-iminothiolane hydrochloride.

3. The composition according to claim 1: 2-diethoxyphosphinothioyliminothiolane.

4. The composition according to claim 1: 2-dimethoxyphosphinothioyliminothiolane.

5. The composition according to claim 1: 2-iminothiane hydrochloride.

6. The composition according to claim 1: 2-dimethoxyphosphinylthioyliminothiane.

References Cited

UNITED STATES PATENTS

| | | | |
|---|---|---|---|
| 3,233,963 | 2/1966 | Olin | 71—2.5 X |
| 3,287,466 | 11/1966 | Klopping | 71—2.5 X |
| 3,293,265 | 12/1966 | Heck | 167—33 X |
| 3,317,562 | 5/1967 | Addor | 71—2.5 X |

JAMES O. THOMAS, JR., *Primary Examiner.*